No. 728,931. PATENTED MAY 26, 1903.
E. A. JOHNSTON.
REAPING ATTACHMENT FOR MOWERS.
APPLICATION FILED APR. 8, 1902.
NO MODEL. 6 SHEETS—SHEET 3.
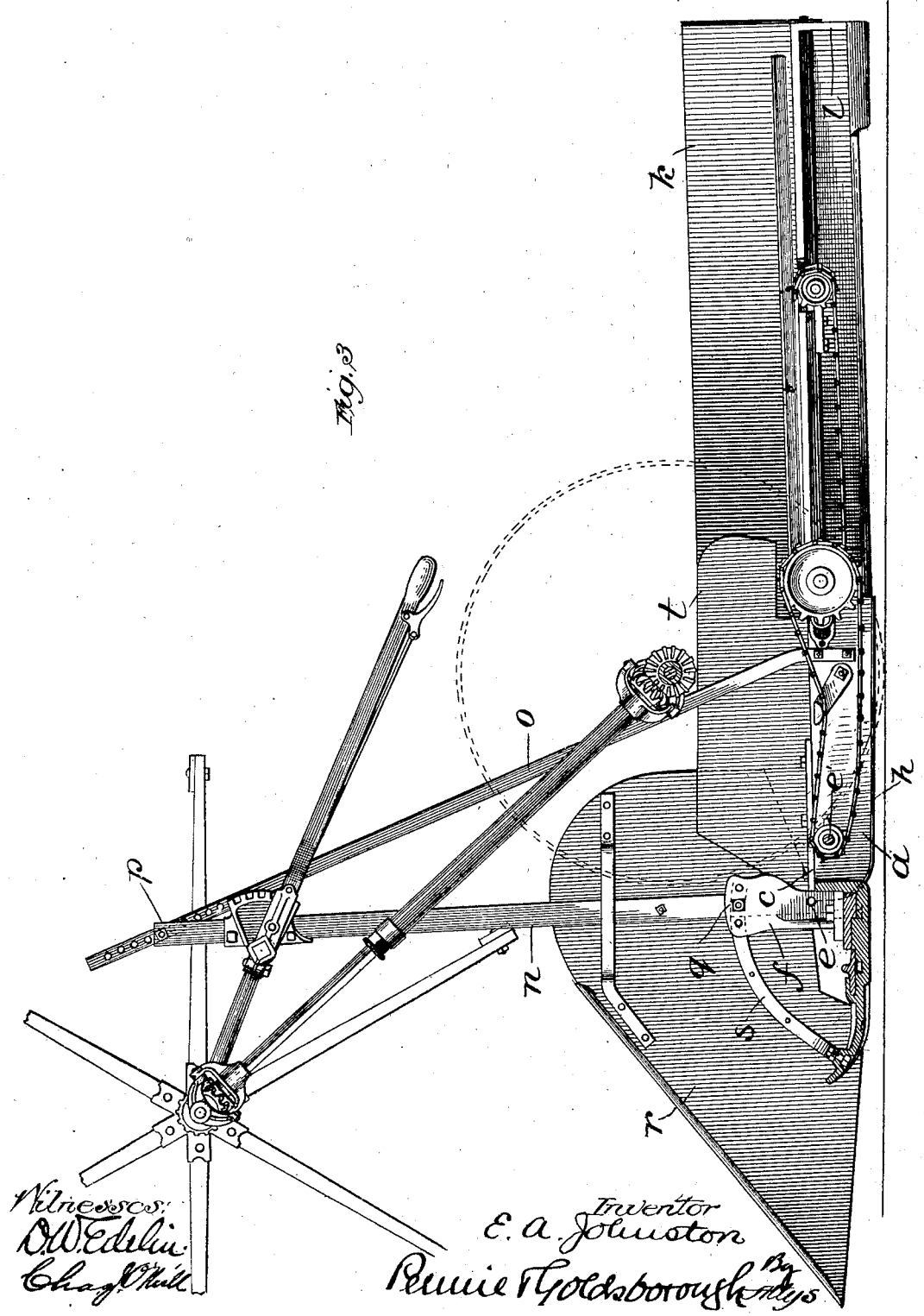

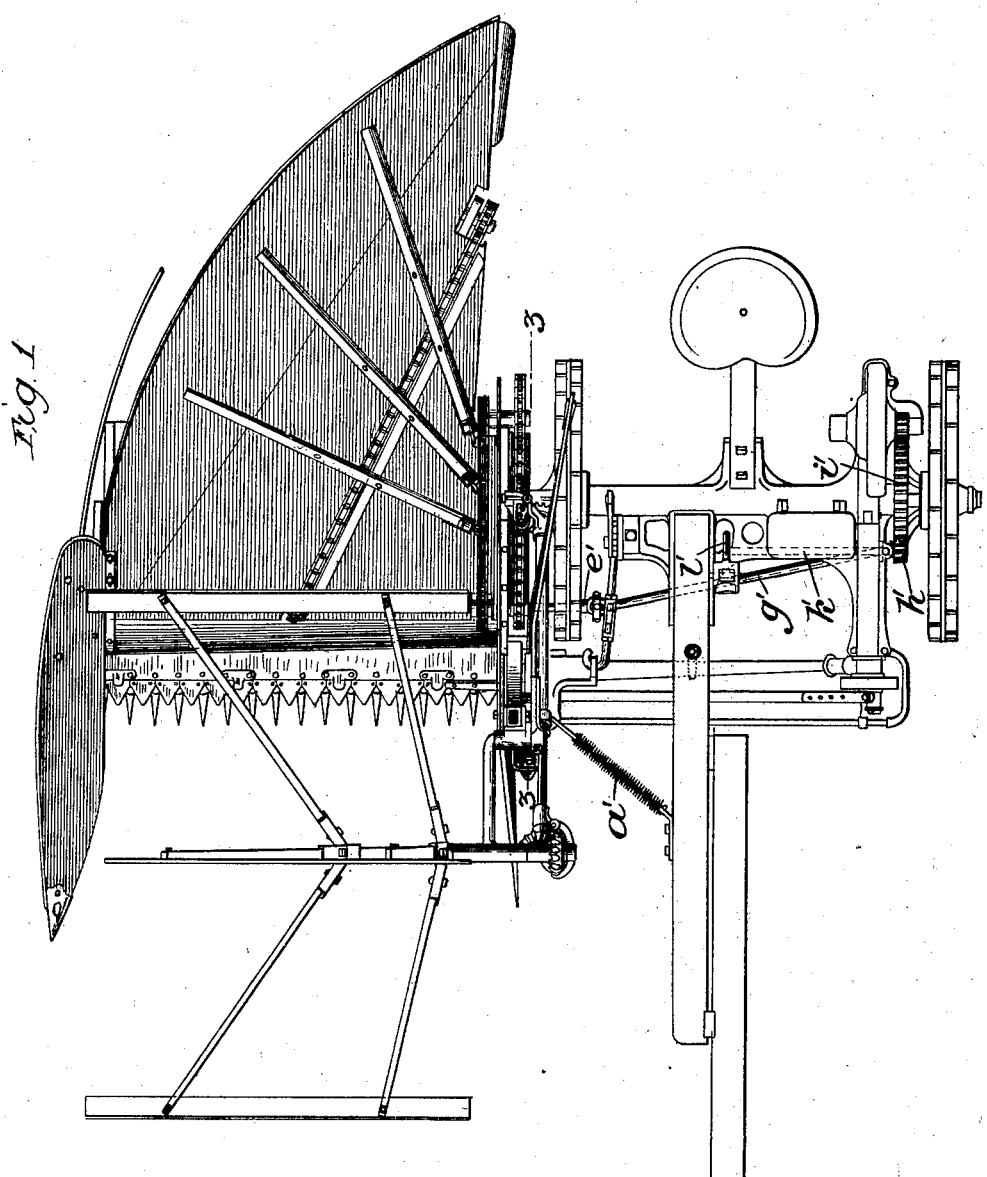

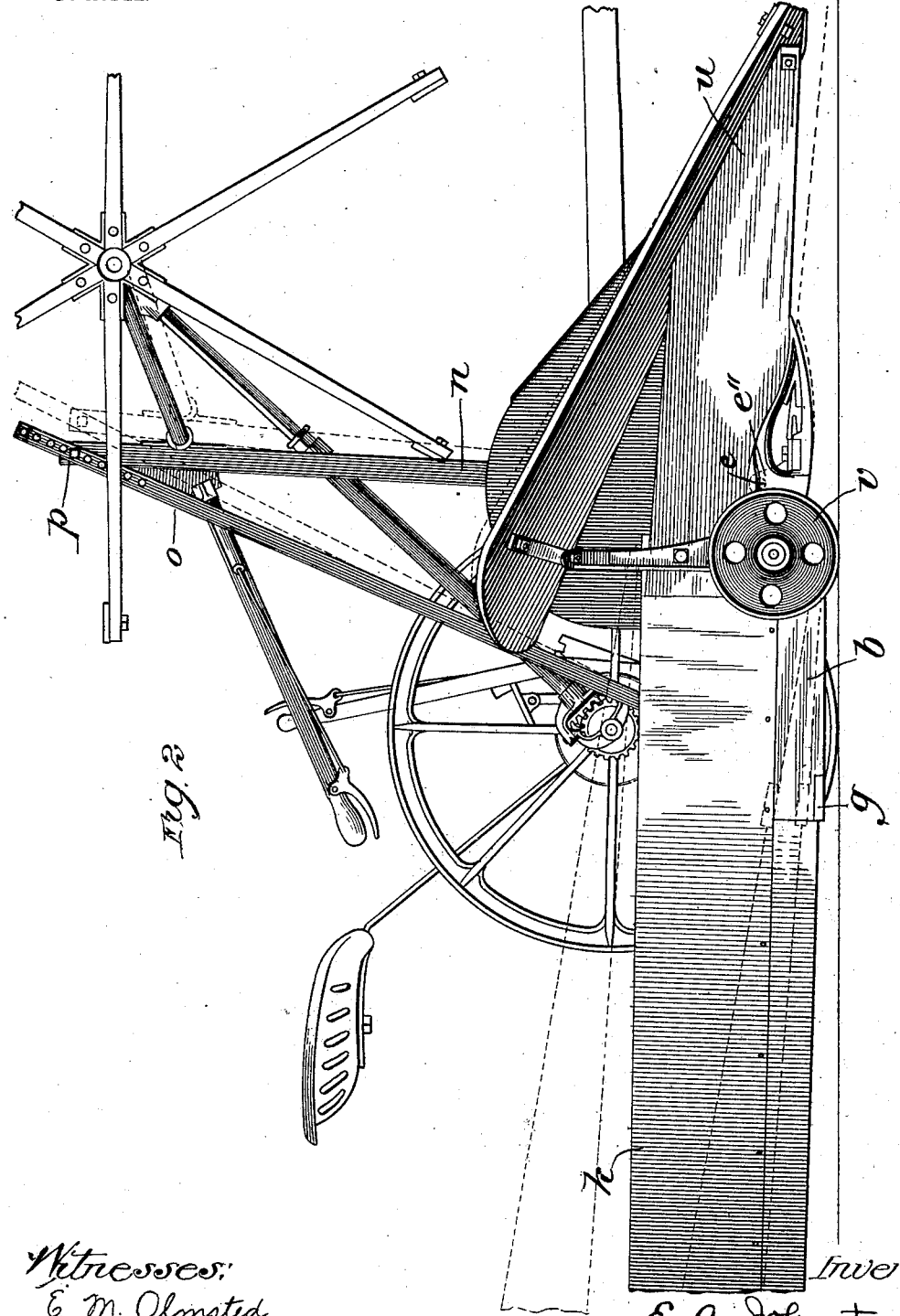

No. 728,931. PATENTED MAY 26, 1903.
E. A. JOHNSTON.
REAPING ATTACHMENT FOR MOWERS.
APPLICATION FILED APR. 8, 1902.
NO MODEL. 6 SHEETS—SHEET 4.
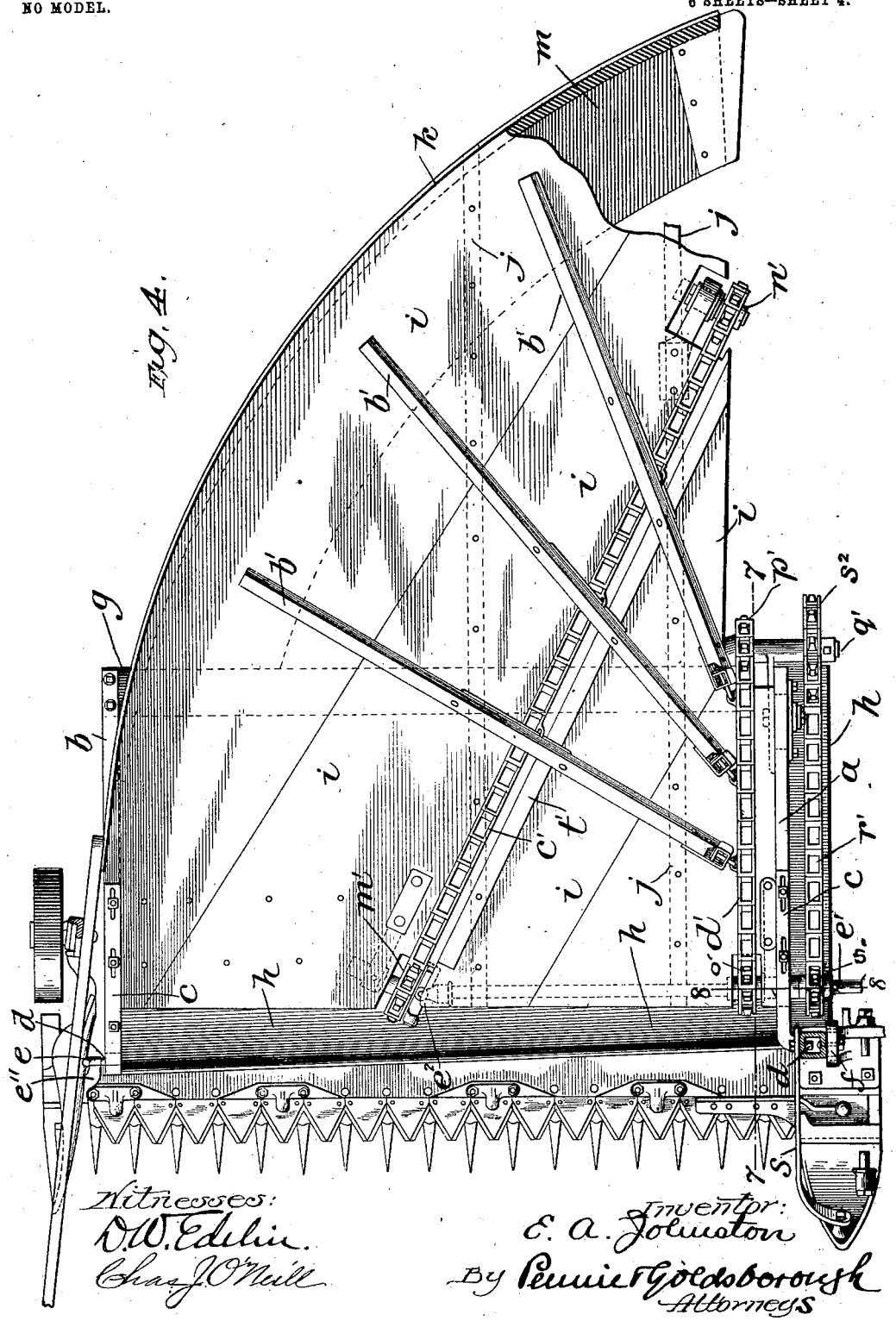

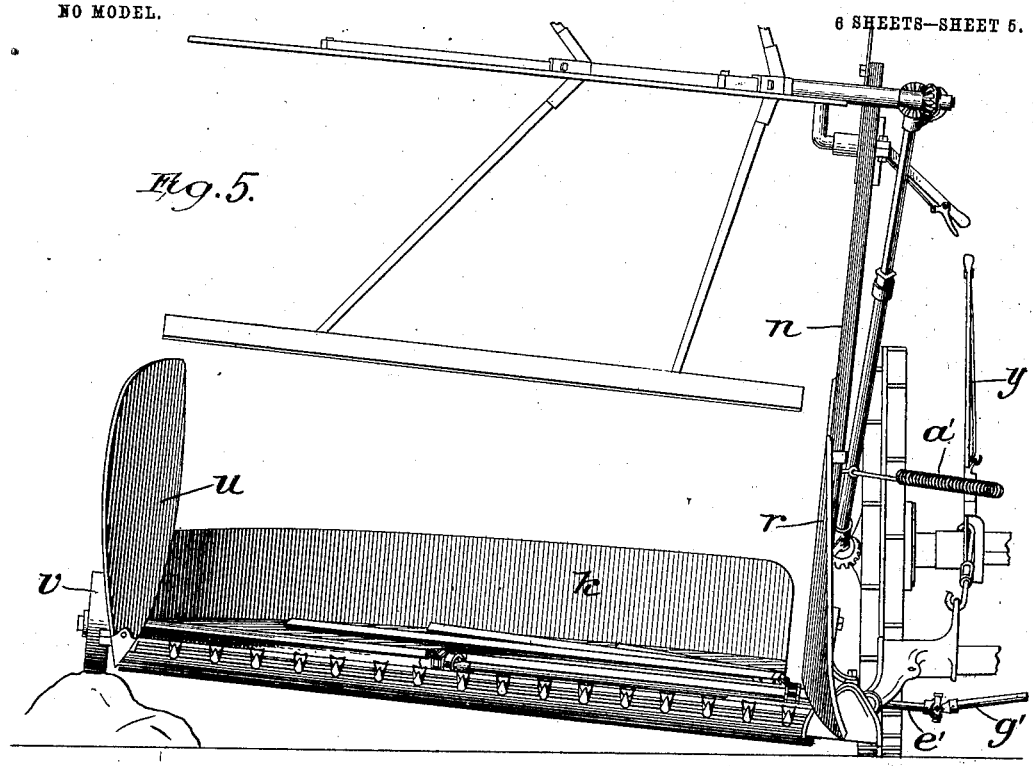
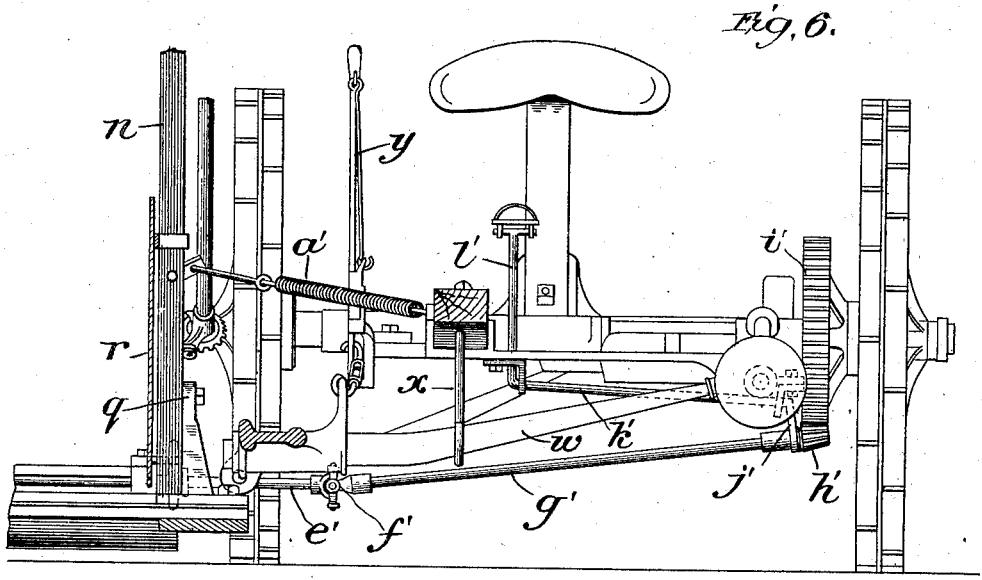

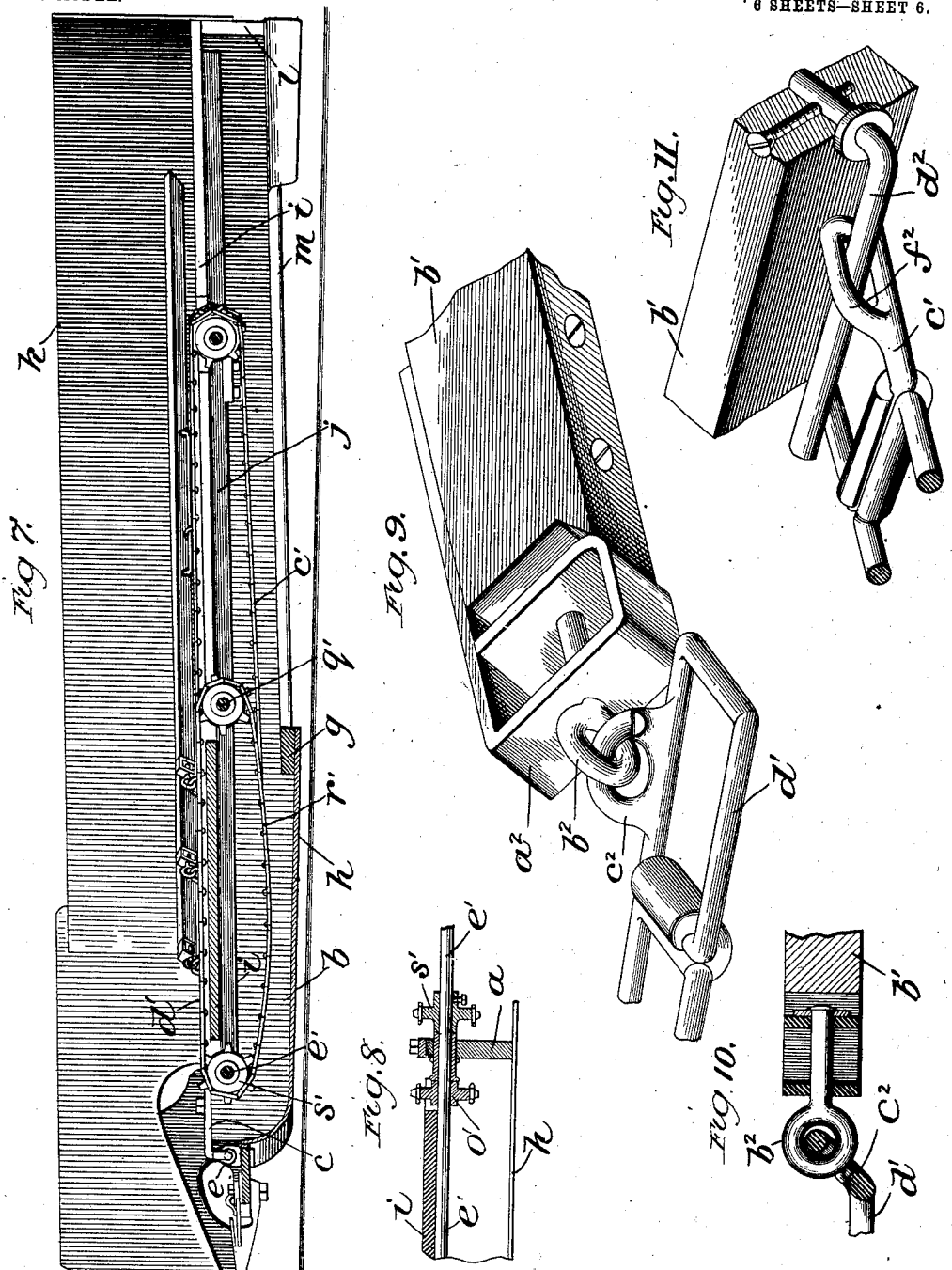

No. 728,931. Patented May 26, 1903.

UNITED STATES PATENT OFFICE.

EDWARD A. JOHNSTON, OF CHICAGO, ILLINOIS, ASSIGNOR TO THE McCORMICK HARVESTING MACHINE COMPANY, OF CHICAGO, ILLINOIS.

REAPING ATTACHMENT FOR MOWERS.

SPECIFICATION forming part of Letters Patent No. 728,931, dated May 26, 1903.

Application filed April 8, 1902. Serial No. 101,894. (No model.)

*To all whom it may concern:*

Be it known that I, EDWARD A. JOHNSTON, a citizen of the United States, residing at Chicago, county of Cook, State of Illinois, have invented certain new and useful Improvements in Reaping Attachments for Mowers; and I do hereby declare the following to be a full, clear, and exact description of the invention, such as will enable others skilled in the art to which it appertains to make and use the same.

The object in view is to provide a side-delivery grain-receiving attachment adapted for temporary connection to the finger-bar of a mowing-machine, so as to convert any given machine from a mower into a reaper, and thereby adapt it to perform the double duty of mowing grass or reaping grain.

The attachment consists generally of a quadrant-shaped platform secured to a frame the side bars of which are adapted to be fastened at the inner and outer shoes of the finger-bar, the platform being provided with devices for raking the grain and depositing it on the ground in gavels at one side thereof.

The raking devices forming part of the attachment are automatic in action and are adapted for connection with the ordinary driving-gearing of the mower, so as to be entirely under control by the driver.

The details of the invention will be fully understood from the following description, taken in connection with the accompanying drawings, wherein—

Figure 1 is a plan view of a mower equipped with my attachment and ready for reaping. Fig. 2 is a side view of the same looking stubbleward. Fig. 3 is a section of Fig. 1 on the line 3 3. Fig. 4 is an enlarged plan view of the platform attached to the finger-bar of a mower. Fig. 5 is a front view of the machine, part of the frame being omitted; and Fig. 6 is a similar view with part of the platform omitted, but showing the entire frame. Fig. 7 is a section of Fig. 4 on the line 7 7. Fig. 8 is a section of Fig. 4 on the line 8 8, and Figs. 9 and 10 are perspectives showing details of the connections between the rake-arms and their operating-chains.

Referring first to Figs. 2, 3, and 4, $a$ and $b$ denote bars set edgewise vertically. Each bar is provided at its forward end with a strap $c$, which is adjustably bolted to its upper edge. The straps have pivot-pins $d$ projecting laterally from their front ends, and these pins enter holes $e$ in a clip $e''$, which is bolted to the finger-bar at the outer shoe and in the reel-post $n$, secured to the vertical bracket $f$, which is secured to the inner shoe. At their rear ends the bars $a$ $b$ are connected together by a cross-bar $g$, which is let flush into their rear edges, and a sheet-metal bottom $h$ is secured to the under side of the cross-bar $g$ and the side bars $a$ $b$, so as to cover and protect the rake-chains and driving-gear on the under side. The front ends of the side bars and the bottom are rounded, as shown in Fig. 7, so as to easily pass over obstructions and fit up close to the rear edge of the finger-bar.

The platform proper consists of a flooring $i$, which extends across from one side bar to the other and is continued in rear of the cross-bar $g$ in the form of a quadrant, the rear part of the flooring being supported by light sills $j$, running fore and aft under the flooring. Around the rear and outer edge of this platform there is the usual upstanding guard $k$, and a board $l$, which is practically a continuation of the outer side board $b$, depends from the under side of the platform all around its edge to the discharge side. The under side of the flooring in rear of the cross-bar $g$ is open, except for a horizontal guide $m$, which is secured to the lower edge of the curved board $l$, just described, and forms a guard and protection on their return stroke for the outer ends of the rake-arms, presently to be described.

The platform attachment being constructed as above described and being connected to the inner and outer shoes by the pivots $d$ $d$, is supported from the machine-frame through the intermediacy of the reel-post $n$ and a brace-rod $o$, which is connected to the side board $a$ near its rear end and extends diagonally upward and forward and is adjustably connected to the post near its upper end, as shown at $p$. The reel-post is rigidly but adjustably secured to the before-mentioned bracket *f* on the inner shoe, as best shown at *q* in Fig. 3, and an inside divider *r* is preferably attached to the reel-post and to a strap *s*, which connects at its forward end to the shoe and forms an additional means of bracing and supporting the reel-post. In Fig. 3 there is also shown a short side board *t*, which is secured to the board *a* and forms practically a rear extension of the inside divider-board just described.

When the reaper attachment is employed, an outer divider *u* and wheel *v*, of any preferred construction, are attached to the outer shoe, and the inner shoe is raised off the ground and held in the raised position by means of a hook *x*, which depends from the tongue or frame and engages the coupling-arm *w*. The finger-bar is thus supported by the wheel *v* and hook *w* above the ground in the manner usual in reapers, and the lifting-lever *y* of the mower and its connections are thrown out of operation and remain idle. It is therefore desirable to provide some means for counterbalancing the platform, all the weight of which pulls down on the reel-post in rear of the finger-bar, and for this purpose I connect one end of a stout coil-spring $a'$ to a point on the tongue considerably in advance of the post, and the opposite end of the spring is connected to the post preferably somewhat above the level of the tongue. The point of connection of either end of the spring may be adjustable to regulate the counterbalancing effect, and the arrangement of the spring in the manner described performs the double duty of counterbalancing the weight of the rearwardly-extending platform and performs the same office also for the outer end of the finger-bar, causing it to run more lightly over the ground.

The devices for raking the grain from the platform consist of arms $b'$, that are connected to chain belts $c'$ $d'$ and are caused to sweep the upper surface of the platform and return underneath the same, between it and the sheet-metal bottom *h*. The connection between these arms and their chains and the arrangement for driving the chains are as follows: Just under the front edge of the flooring *i* there is a shaft $e'$, which has a bearing in the side board *a* near its stubble end and is connected, by means of a universal joint $f'$, to a shaft $g'$, that extends diagonally outward and rearward and has a pinion $h'$ meshing with the main drive-gear of the machine. The outer end of the shaft $g'$ and its pinion are carried in an adjustable bearing $j'$, that is controlled by a rock-shaft $k'$, having at its other end an upstanding crank-arm $l'$, which comes up through the frame in position to be operated by the driver's foot, so that the pinion $h'$ may be thrown into and out of gear with the driving-wheel at the will of the driver.

The shaft $e'$ at its outer end is connected by a universal joint $e^2$ to a sprocket-wheel $m'$, which is journaled in a bearing-box on the under side of the flooring *i* at an angle to the shaft. The sprocket-wheel is located with its edge just above the surface of the flooring, and the angle between it and the shaft $e'$ is such that the chain belt $c'$, which is thrown around it, will extend diagonally from about the middle of the forward edge of the platform to the outer or discharge side of the same, as best shown in Fig. 4, where it runs around a sprocket-wheel $n'$, mounted on a stud, carried by a bearing-box similar to the one carrying the sprocket $m'$, and returns underneath the platform. The shaft $e'$ thus drives the chain $c'$, and it also drives the shorter chain $d'$, which runs parallel with the stubble edge of the platform. This short chain runs around a sprocket-wheel $o'$, that is loose on the shaft $e'$, just inside the stubble side bar *a*, and at its rear end it runs around a similar wheel $p'$, fixed on the grain end of a short cross-shaft $q'$, which communicates motion to the chain $d'$ from the shaft $e'$ through the intermediacy of a chain belt $r'$, which is driven by a sprocket-driver $s'$, fixed to the shaft $e'$ on the opposite side of the bar *a* from the loose sprocket $o'$.

As will be understood from Fig. 4, the chain $c'$ is about twice the length of the chain $d'$, and the object of the arrangement just described is to drive the two at different rates of speed from the same shaft. The chain $c'$ is driven directly by the shaft, which is revolved rapidly by the large driving-gear $i'$. The chain $d'$ is driven indirectly from the shaft by the speed-reducing arrangement already described, consisting of the small sprocket-wheel $s'$, the larger sprocket-wheel $s^2$ on the shaft $q'$, and the sprocket $p'$.

The rake-arms $b'$ are each connected to both the chains $c'$ and $d'$ and are caused to sweep over the platform close to the surface of the floor from the front edge to the discharge side. They travel, as clearly indicated in Fig. 4, with the chains, rising above the floor *i* between its front edge and the finger-bar and falling below the floor at the discharge side, whence they return under the floor, being protected at their outer ends by the guide *m* and their inner ends and the chains being protected by the guard-plate *h*, already described. A strip $t'$ is secured to the upper surface of the table parallel with and alongside the chain $c'$, the object of this strip being to form a chafing-surface for the rake-arms and a guard for the chain.

The connections between the rake-arms and the chains are shown in Figs. 8 to 10. The inner ends of the arms are provided with end iron $a^2$, carrying swiveled eyebolts $b^2$, and the eyes of these bolts are connected to loops $c^2$, projecting laterally from certain of the links of the chain $d'$ on its grainward side. There may be as many of these rake-arms as desired, and of course only such of the links as have arms attached to them will be provided with side loops.

The connection between the rake-arms and the chain $c'$ must be a sliding one in order to accommodate the changing positions of the arms with respect to the chain, especially at the points where the arms pass from above to below the floor, or vice versa. For this purpose the arms are provided with long bails or travelers $d^2$, and certain of the links of the chain $c'$ have eyes $f^2$, through which the travelers pass, so that the point of connection between the chain and the rake-arms may adjust itself along the arms as required by the varying angle of the arms with respect to the chain and the distance between said chain and chain $d'$.

The construction being as thus described, it is believed the operation will be understood without further explanation, except perhaps to state that the rake-arms are connected to the operating-chains in groups. Only one group is shown herein, and it consists of three arms. There may be other groups, however, if desired, and a greater or less number of arms may constitute each group. The grain is laid straight back on the platform by the reel and accumulates thereon until the rake-arms sweep the gavels off. These arms rise above the floor of the platform parallel with the finger-bar and between its rear edge and the front edge of the floor, as will be understood from Figs. 4 and 7. As the rake-arms travel rearward their angle constantly changes, owing to the greater speed of the chain $c'$, until at the delivery edge of the platform they extend straight back at right angles to the bar, in which position they pass around the edge to the under side and return to the starting-point with the lower ply of the chain. As they pass forward under the floor their position relative to the finger-bar is gradually reversed, the chain $c'$ always causing their outer ends to travel faster than the inner ends. The bars thus have a resultant curvilinear motion and effect the discharge of the grain in bunches or gavels in rear of the drive-wheels out of the way of the machine on its next round.

When it is desired to lay a continuous swath, it is only necessary to provide the chains $c'$ and $d'$ throughout their length with rake-arms and operate them continually.

Having thus described my invention, what I claim, and desire to secure by Letters Patent, is—

1. A side-delivery reaping attachment for mowers, consisting of a quadrant-shaped platform attachable in rear of the finger-bar, said platform being equipped with a raking device consisting of chains traveling rearward over the floor of the platform and returning to position under the floor, and arms pivotally connected to and traveling with the chains.

2. A side-delivery reaping attachment for mowers, consisting of a quadrant-shaped platform attachable in rear of the finger-bar, said platform being equipped with a raking device consisting of a pair of chains moving at different speeds, and rake-arms attached at their inner ends to the slower chain and having a sliding connection with the faster chain.

3. A side-delivery reaping attachment for mowers, consisting of a quadrant-shaped platform attachable in rear of the finger-bar, said platform having a bottom to fit against the finger-bar, a flooring with an intervening space between it and the bar, and a raking device consisting of chains traveling rearward over the floor and returning to position under the floor, and arms pivotally connected to and moving with the chains.

4. A side-delivery reaping attachment for mowers, consisting of a quadrant-shaped platform attachable in rear of the finger-bar, said platform being equipped with a raking device consisting of a short chain at the inner, or the discharge side of the platform, a longer chain running diagonally across the platform from its front to its discharge end, and rake-arms pivotally connected at their inner ends to the short chain and having a sliding connection with the diagonal chain.

5. A side-delivery reaping attachment for mowers, consisting of a quadrant-shaped platform attachable in rear of the finger-bar, said platform being equipped with a raking device consisting of a short chain running from the front edge of the platform rearward in line with its discharge side, a longer chain running diagonally rearward across the platform from about the middle of its front edge to its discharge side, rake-arms pivotally connected at their inner ends to the short chain and having a sliding connection with the diagonal chain about midway of their length, and means for driving the long chain faster than the short one so as to give the arms a curvilinear sweep over the platform.

6. The combination with a mower, of a reel-post removably attached to the inner shoe, a reaper-platform detachably connected to the inner and outer shoes, and a supporting connection extending from an elevated point on the reel-post to a point on the platform in rear of its pivot.

7. The combination with a mower, of a reel-post removably attached to the inner shoe, a reaper-platform detachably pivoted to the inner and outer shoes, a supporting connection extending from a point on the platform in rear of its pivot to an elevated point on the reel-post, and a counterbalancing-spring extending from the post diagonally forward to the tongue.

8. The combination with a mower, of a reaper attachment consisting of a platform detachably connected in rear of the finger-bar, a grain-wheel detachably secured at the outer end of the finger-bar, and a support pendent from the tongue or frame to temporarily support the coupling-bar and inner shoe.

9. In a grain-raking device, the combination of the chain belts $c'$ and $d'$, and the rake-arms $b'$, the latter having swiveled eyebolts $b^2$ at their inner ends connecting with the links of chain $d'$, and the chain $c'$ being connected to travelers $d^2$ on the arms about midway of their length.

10. The combination with a mower and its drive-gear $i'$, of a reaper-platform detachably connected in rear of the finger-bar and having a raking device consisting of chains $c'$, $d'$, moving in diagonal lines rearward from the finger-bar, with rake-arms $b'$ pivotally connected to the chains, and the drive-shaft $e'$ connected to the chains, the shaft $g'$ having a pinion $h'$, said shaft being mounted in movable bearings, as $j'$, so as to be disconnected from and connected to the gear $i'$ at the will of the driver.

In testimony whereof I affix my signature in presence of two witnesses.

EDWARD A. JOHNSTON.

Witnesses:
   CHAS. H. CHAMBERS,
   F. H. GERE.